(12) United States Patent
Dougherty

(10) Patent No.: US 8,113,190 B2
(45) Date of Patent: Feb. 14, 2012

(54) COMPACT CONVEYOR OVEN

(75) Inventor: Carl J. Dougherty, Plano, TX (US)

(73) Assignee: Turbochef Technologies, Inc., Atlanta, GA (US)

( * ) Notice: Subject to any disclaimer, the term of this patent is extended or adjusted under 35 U.S.C. 154(b) by 271 days.

(21) Appl. No.: 12/045,063

(22) Filed: Mar. 10, 2008

(65) Prior Publication Data
US 2008/0216812 A1    Sep. 11, 2008

Related U.S. Application Data

(60) Provisional application No. 60/906,394, filed on Mar. 10, 2007.

(51) Int. Cl.
A21B 1/48     (2006.01)
A21B 1/00     (2006.01)
A47J 39/00    (2006.01)
F24C 15/32    (2006.01)

(52) U.S. Cl. .................. 126/21 A; 126/15 A; 126/15 R; 126/21 R; 126/41 C; 99/360; 99/386; 99/443 C; 219/653; 219/684; 219/698; 219/700

(58) Field of Classification Search ............... 126/21 A, 126/1 R, 15 A, 15 R, 19 R, 21 R, 41 C, 261; 99/360–362, 367, 386, 443 C; 219/653, 219/684, 698, 700; A21B 1/00, 1/24, 1/26, A21B 1/33, 1/36, 1/42, 1/48, 3/00, 3/02; A47J 39/00; F24C 15/00, 15/32; F25D 17/06, F25D 17/08; F27B 9/00, 9/10, 9/24; F27D 7/00, F27D 7/04
See application file for complete search history.

(56) References Cited

U.S. PATENT DOCUMENTS

| | | | |
|---|---|---|---|
| 2,028,944 A * | 1/1936 | Morrison | 99/386 |
| 2,264,525 A * | 12/1941 | Hall | 126/1 A |
| 2,704,802 A | 3/1955 | Blass et al. | |
| 3,210,511 A | 10/1965 | Smith | |
| 3,813,216 A | 5/1974 | Baur et al. | |
| 3,828,760 A | 8/1974 | Farber et al. | |
| 4,154,861 A | 5/1979 | Smith | |
| 4,283,614 A | 8/1981 | Tanaka et al. | |
| 4,327,279 A | 4/1982 | Guibert | |
| 4,337,384 A | 6/1982 | Tanaka et al. | |
| 4,338,911 A | 7/1982 | Smith | |
| 4,409,453 A | 10/1983 | Smith | |
| 4,431,889 A | 2/1984 | Saponara et al. | |
| 4,462,383 A * | 7/1984 | Henke et al. | 126/21 A |

(Continued)

FOREIGN PATENT DOCUMENTS
DE    2557867    6/1977
(Continued)

OTHER PUBLICATIONS

U.S. Appl. No. 11/908,169, filed Sep. 10, 2007, McFadden.

(Continued)

Primary Examiner — Steven B McAllister
Assistant Examiner — Daniel E Namay
(74) Attorney, Agent, or Firm — Dean W. Russell; Kristin M. Crall; Kilpatrick Townsend & Stockton LLP

(57) ABSTRACT

A compact conveyor oven is disclosed comprising a cooking chamber, thermal heating source, conveyor means and independent top and bottom airflow within the cooking chamber wherein substantially equal pressurization of the top and bottom airflows is achieved within the compact footprint.

27 Claims, 11 Drawing Sheets

U.S. PATENT DOCUMENTS

Figure 1:
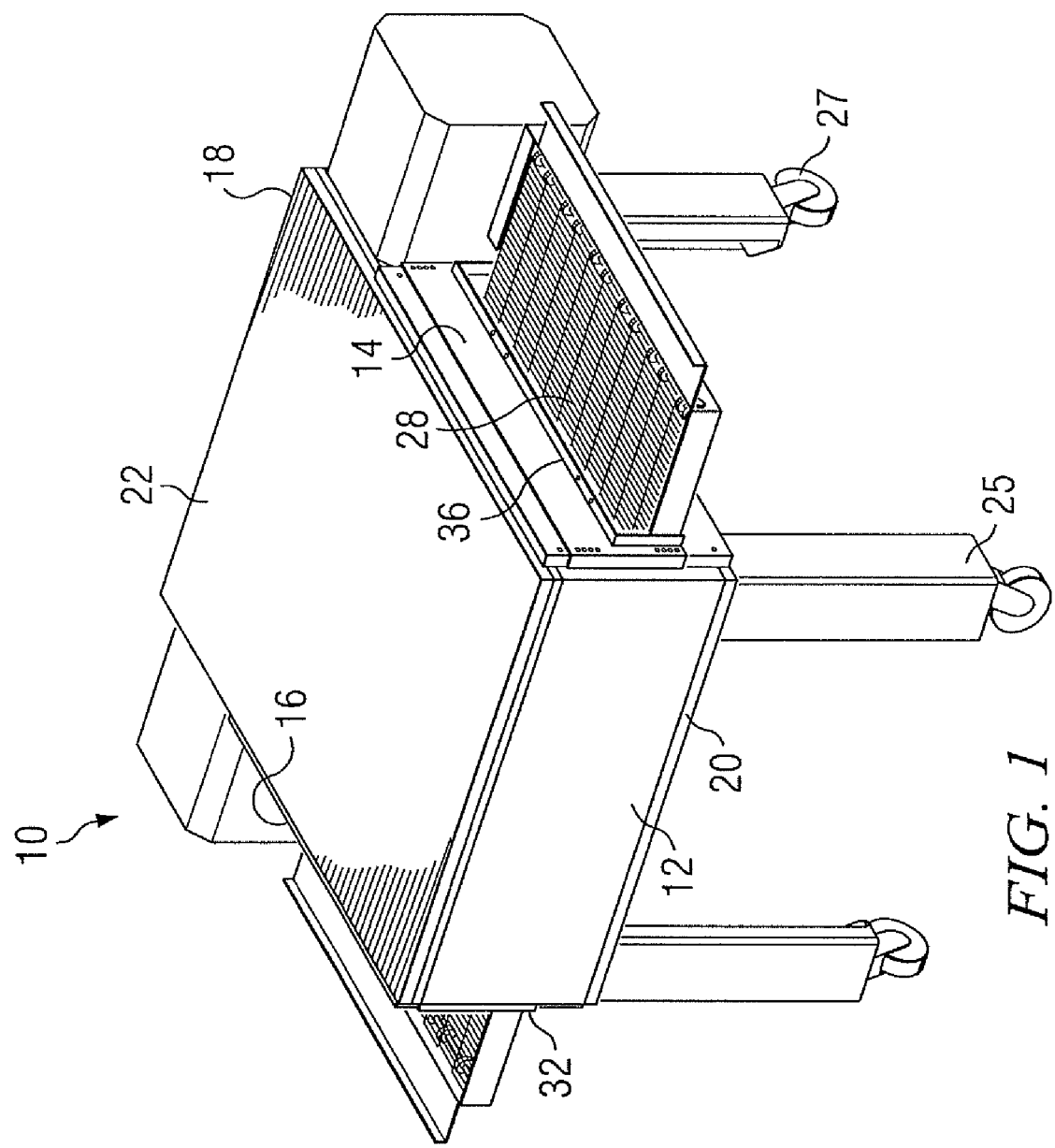

| | | | |
|---|---|---|---|
| 4,464,554 A | | 8/1984 | Bakanowski et al. |
| 4,480,164 A | | 10/1984 | Dills |
| 4,556,043 A | * | 12/1985 | Bratton .................. 126/21 A |
| 4,576,090 A | * | 3/1986 | Burtea .................. 99/443 C |
| 4,591,333 A | * | 5/1986 | Henke .................. 432/10 |
| 4,626,661 A | * | 12/1986 | Henke .................. 219/400 |
| 4,752,268 A | | 6/1988 | Kataoka et al. |
| 4,757,800 A | * | 7/1988 | Shei et al. .................. 126/21 A |
| 4,951,648 A | * | 8/1990 | Shukla et al. .................. 126/21 A |
| 4,958,412 A | | 9/1990 | Stanek |
| 4,960,100 A | * | 10/1990 | Pellicane .................. 126/21 A |
| 4,965,435 A | | 10/1990 | Smith et al. |
| 5,025,775 A | * | 6/1991 | Crisp .................. 126/21 A |
| 5,131,841 A | * | 7/1992 | Smith et al. .................. 432/59 |
| 5,161,889 A | | 11/1992 | Smith et al. |
| 5,166,487 A | * | 11/1992 | Hurley et al. .................. 219/683 |
| 5,277,105 A | * | 1/1994 | Bruno et al. .................. 99/443 C |
| 5,369,250 A | | 11/1994 | Meredith |
| 5,401,940 A | * | 3/1995 | Smith et al. .................. 219/679 |
| 5,421,320 A | * | 6/1995 | Brown .................. 126/299 R |
| 5,423,248 A | * | 6/1995 | Smith et al. .................. 99/443 C |
| 5,454,295 A | * | 10/1995 | Cox et al. .................. 99/332 |
| 5,676,870 A | | 10/1997 | Wassman et al. |
| 5,717,192 A | * | 2/1998 | Dobie et al. .................. 219/681 |
| 5,825,000 A | | 10/1998 | Jun |
| 5,826,496 A | | 10/1998 | Jara |
| 5,964,044 A | * | 10/1999 | Lauersdorf et al. .................. 34/224 |
| 5,994,672 A | | 11/1999 | Mestnik |
| 6,058,924 A | | 5/2000 | Pool et al. |
| 6,060,701 A | | 5/2000 | McKee et al. |
| 6,234,161 B1 | * | 5/2001 | Levi et al. .................. 126/21 R |
| 6,369,360 B1 | | 4/2002 | Cook |
| 6,376,817 B1 | | 4/2002 | McFadden et al. |
| 6,399,930 B2 | | 6/2002 | Day et al. |
| 6,403,937 B1 | | 6/2002 | Day et al. |
| 6,437,303 B1 | | 8/2002 | Dorr et al. |
| 6,481,999 B2 | | 11/2002 | Knost |
| 6,576,874 B2 | * | 6/2003 | Zapata et al. .................. 219/400 |
| 6,592,364 B2 | * | 7/2003 | Zapata et al. .................. 432/145 |
| 6,712,063 B1 | | 3/2004 | Thorneywork |
| 6,874,495 B2 | | 4/2005 | McFadden |
| 6,880,545 B2 | * | 4/2005 | Heber et al. .................. 126/21 A |
| 7,055,518 B2 | | 6/2006 | McFadden |
| 7,604,000 B2 | * | 10/2009 | Wolfe et al. .................. 126/21 A |
| 2004/0211765 A1 | | 10/2004 | McFadden |
| 2004/0216732 A1 | | 11/2004 | McFadden |
| 2005/0155598 A1 | * | 7/2005 | Berti .................. 126/39 BA |
| 2005/0217503 A1 | | 10/2005 | McFadden |
| 2006/0169272 A1 | | 8/2006 | McFadden et al. |
| 2007/0012307 A1 | * | 1/2007 | Wiker et al. .................. 126/21 A |
| 2007/0137633 A1 | | 6/2007 | McFadden |
| 2007/0194011 A1 | | 8/2007 | McFadden |
| 2007/0295322 A1 | | 12/2007 | Dobie et al. |
| 2008/0092874 A1 | * | 4/2008 | Kolecki .................. 126/299 D |
| 2008/0099008 A1 | | 5/2008 | Bolton et al. |
| 2008/0105133 A1 | | 5/2008 | McFadden et al. |
| 2008/0105135 A1 | | 5/2008 | McFadden et al. |
| 2008/0105136 A1 | | 5/2008 | McFadden |
| 2008/0105249 A1 | | 5/2008 | McFadden et al. |
| 2008/0106483 A1 | | 5/2008 | McFadden et al. |
| 2009/0139976 A1 | * | 6/2009 | Lee .................. 219/400 |

FOREIGN PATENT DOCUMENTS

| | | |
|---|---|---|
| EP | 0 096 159 | 12/1983 |
| EP | 0429822 | 6/1991 |
| GB | 2043237 | 10/1980 |
| JP | 63-317068 | 12/1988 |
| WO | WO 2004/014139 | 2/2004 |
| WO | WO 2005/087009 | 9/2005 |
| WO | WO 2006/041814 | 4/2006 |
| WO | WO 2006/081202 | 8/2006 |

OTHER PUBLICATIONS

U.S. Appl. No. 11/928,037, filed Oct. 30, 2007, McFadden.

Partial International Search report in related Application No. PCT/US2008/056358.

* cited by examiner

COMPACT CONVEYOR OVEN

CROSS REFERENCE TO RELATED APPLICATIONS

This application claims the benefit of U.S. Provisional Patent Application Ser. No. 60/906,394, filed Mar. 10, 2007, entitled COMPACT CONVEYOR OVEN. This provisional application is incorporated herein as if fully set forth.

BACKGROUND

The typical cook time for a food product such as a fresh medium size pizza through a conventional conveyor oven is approximately 7 minutes. The conveyor oven therefore reduces cooking time as compared to previous ovens such as the deck oven, and also simplifies the cooking procedure because the food product is automatically loaded into and unloaded from the cooking tunnel.

Conveyor ovens typically utilize a continuous open link conveyor belt to transport food products through this heated tunnel, or cooking chamber, which has openings at each end of the oven through which the conveyor belt sufficiently extends in order for the operator to start incoming food product on one end, and retrieve the finished cook product from the other. A standard impingement style conveyor oven typically employs the use of a cooking chamber approximately 70 inches (177.8 cm) long and 32 inches (81.28 cm) wide. For the foregoing reasons, there is a need for a faster cooking, more compact conveyor oven.

SUMMARY

The present invention is directed to a more compact conveyor oven that cooks food product faster than conventional conveyor ovens. According to certain versions of the invention, a first airflow delivery system comprises a first airflow circulation means that directs airflow away from the airflow circulation means and airflow directing vanes that thereafter alter the direction of the airflow in a direction back towards the airflow directing means such that substantially equal pressure is provided to a first nozzle plate for impingement of airflow through apertures of said nozzle plate upon the top surface of a food product within the compact conveyor oven; and a second airflow delivery system comprising a second airflow circulation means that directs airflow away from the second airflow circulation means and airflow directing vanes that thereafter alter the direction of the airflow in a direction back towards the airflow directing means such that substantially equal pressure is provided to a second nozzle plate for impingement of airflow through apertures of said nozzle plate upon the bottom surface of a food product within the compact conveyor oven.

According to certain versions of the invention an airflow deflecting vane is positioned to require airflow to be directed around said deflecting vane in order to prevent short circuiting of return airflow to the first and second airflow circulation means.

According to certain versions of the invention airflow deflecting vanes are positioned to direct spent airflow upwards for return to the first airflow circulation means and downwards for return to the second airflow circulation means.

According to certain versions of the invention a continuous top and bottom nozzle plate is positioned allowing for an economical velocity pressure system to be utilized.

Additional objects, features and advantages of the present invention will become readily apparent from the following detailed description of the exemplary version thereof, when taken in conjunction with the drawings wherein like reference numerals refer to corresponding parts in the several views.

DRAWINGS

Figure 2:
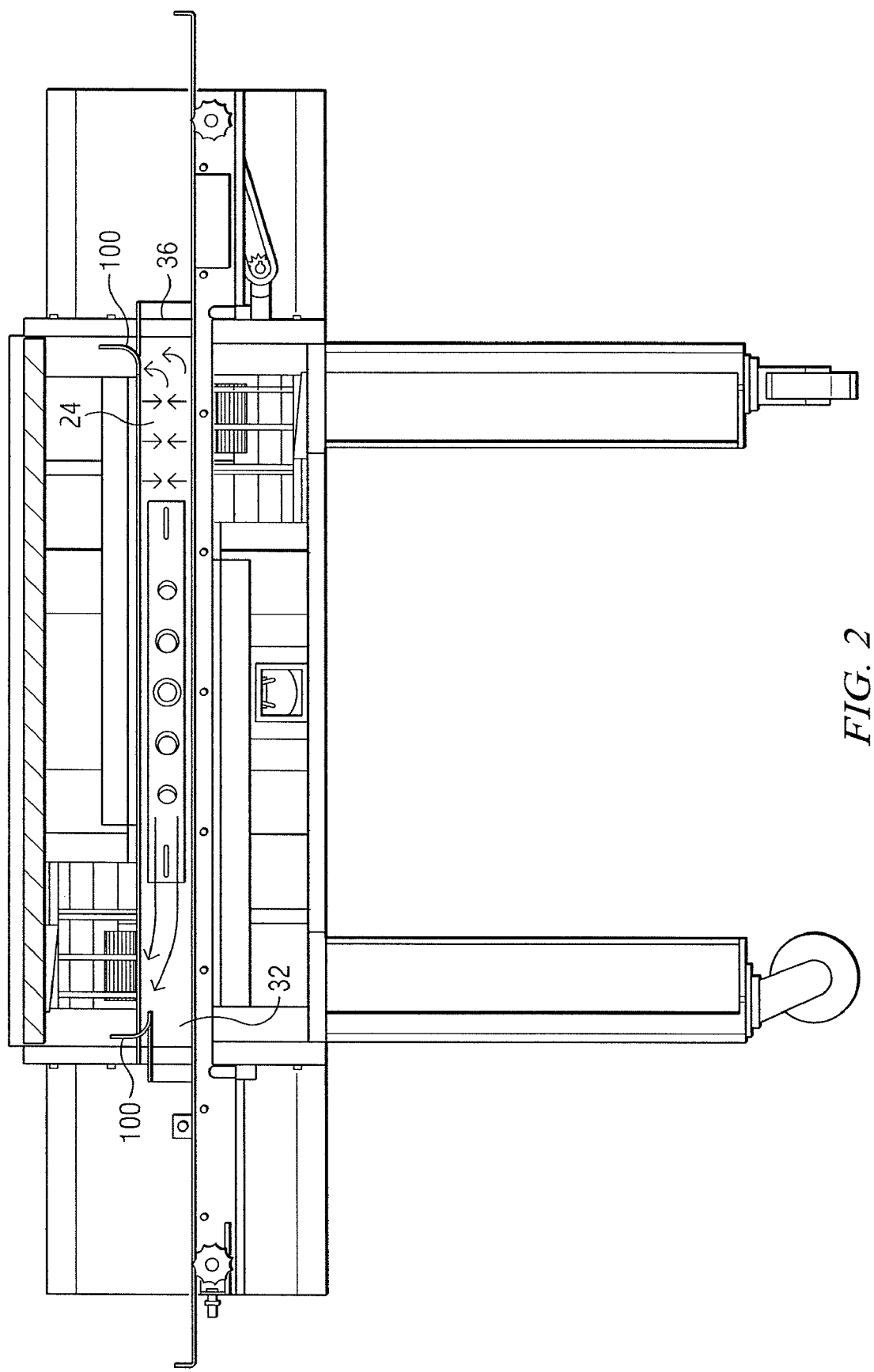
Figure 3:
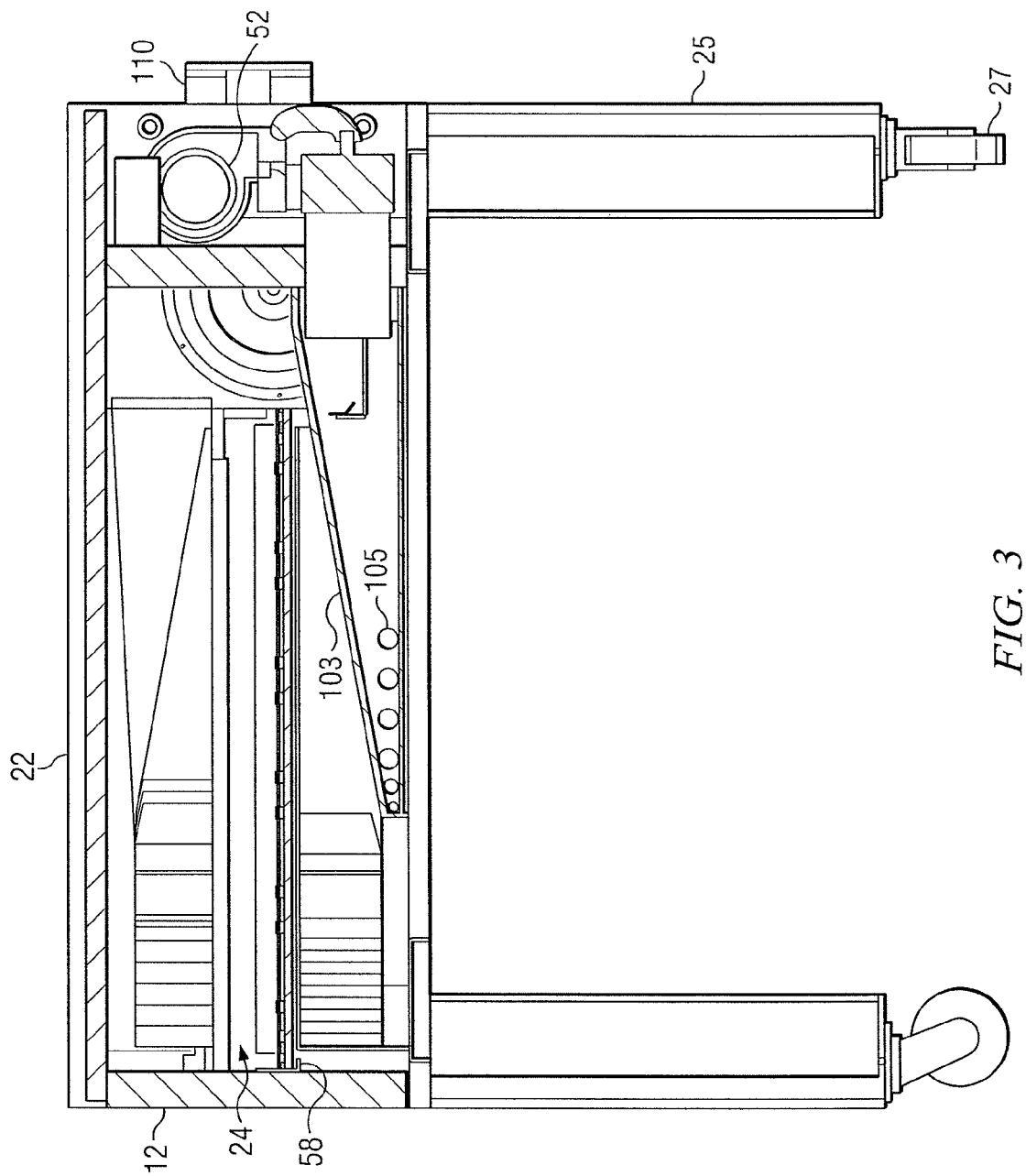
Figure 4:
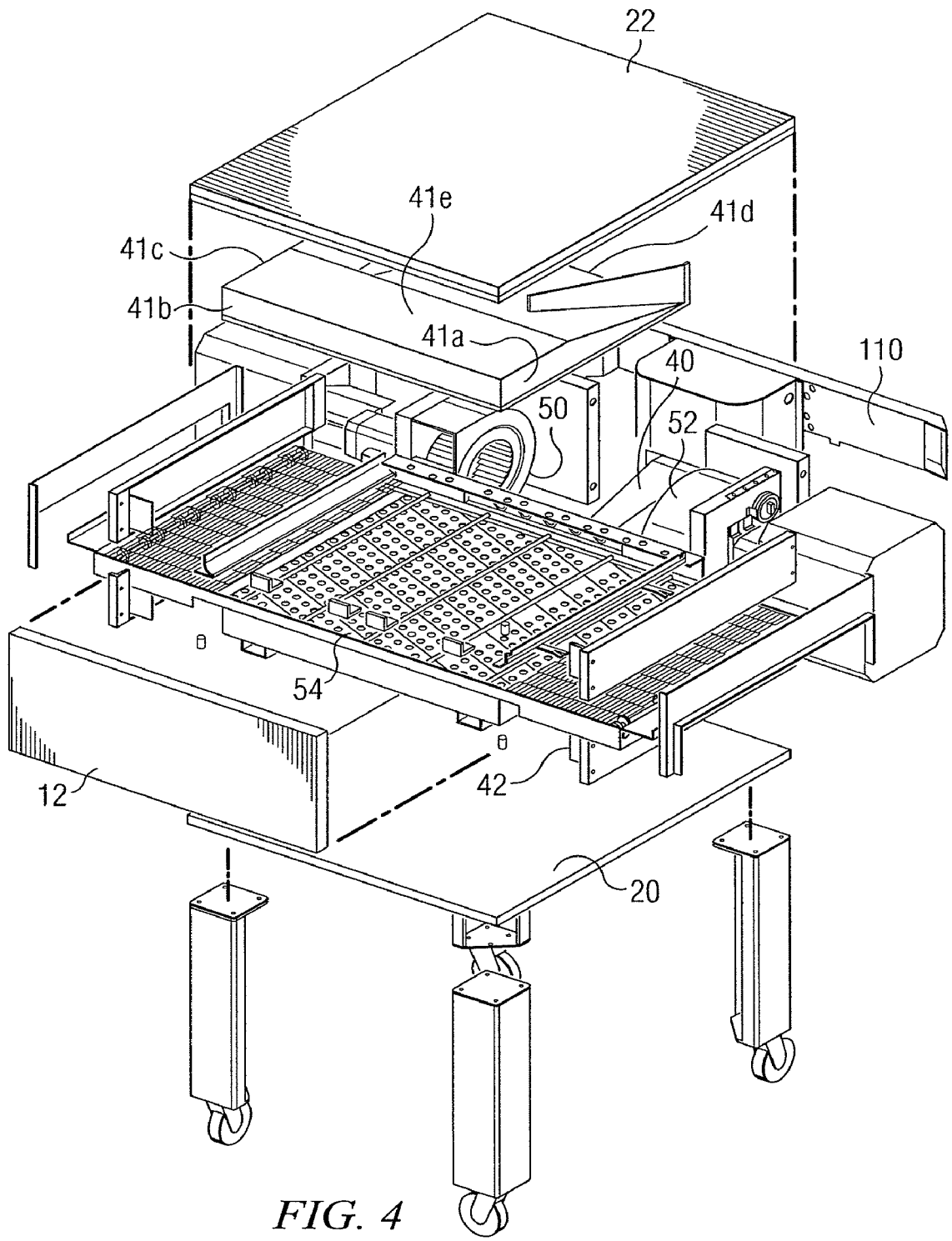
Figure 5:
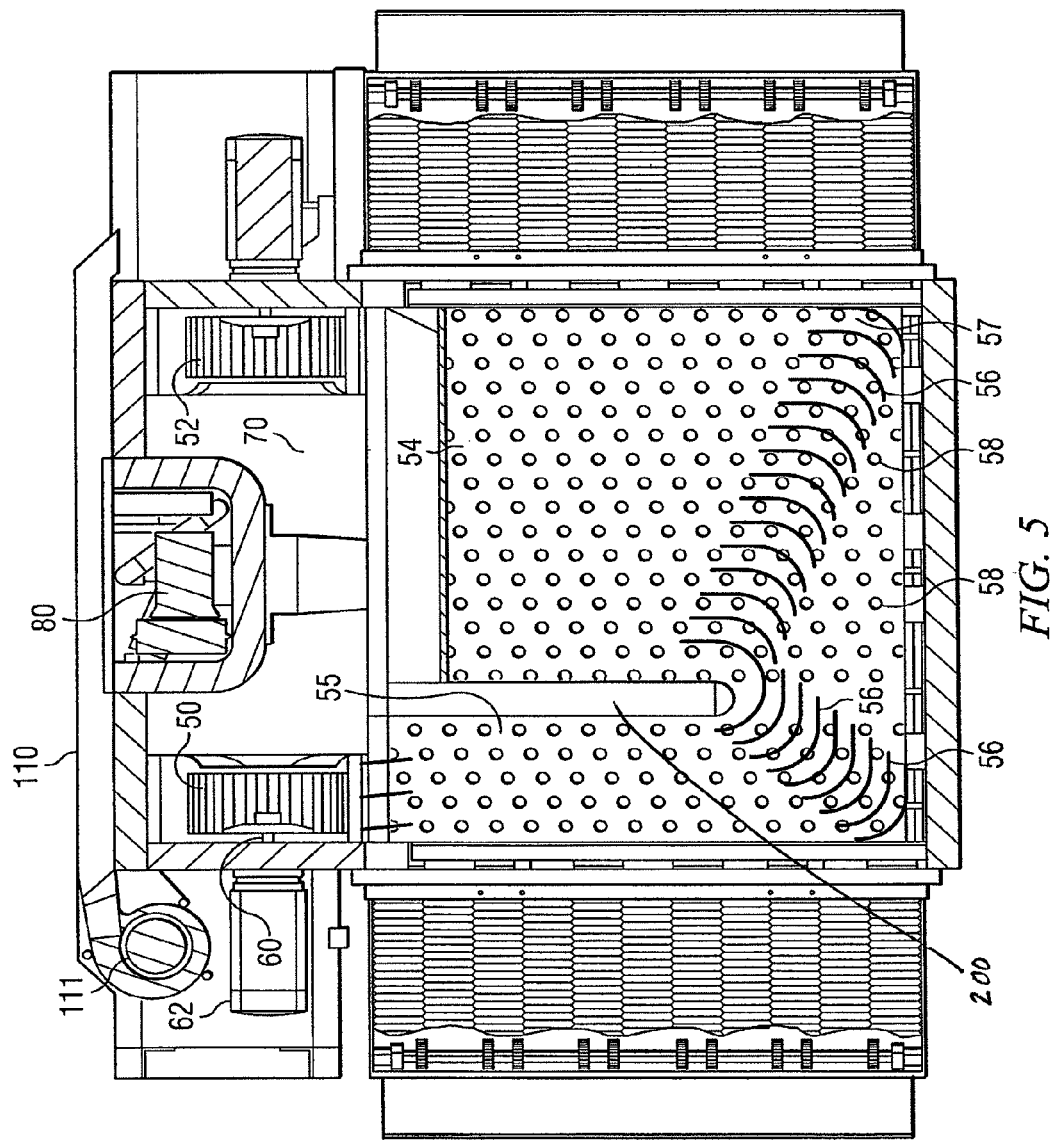
Figure 6:
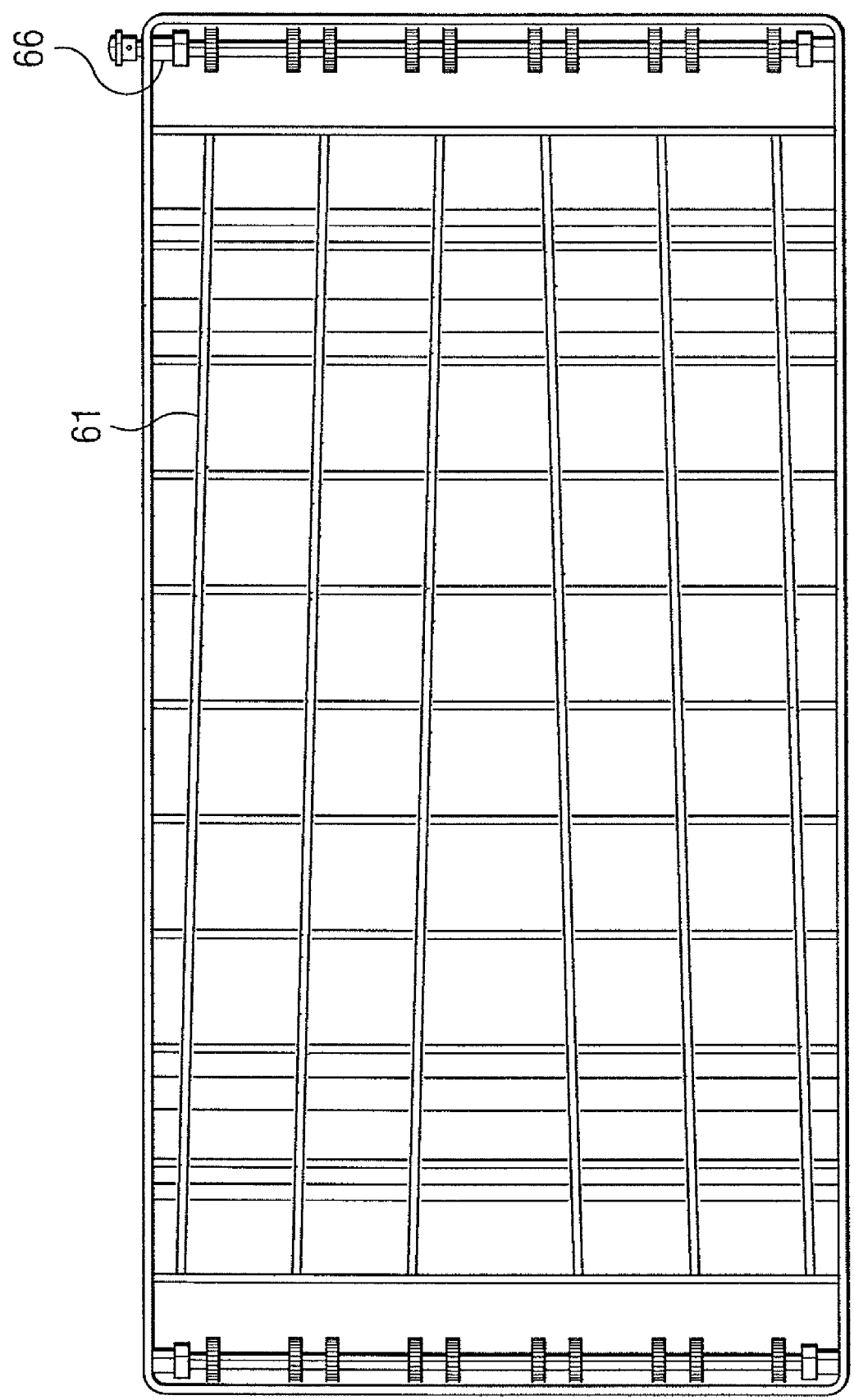
Figure 7:
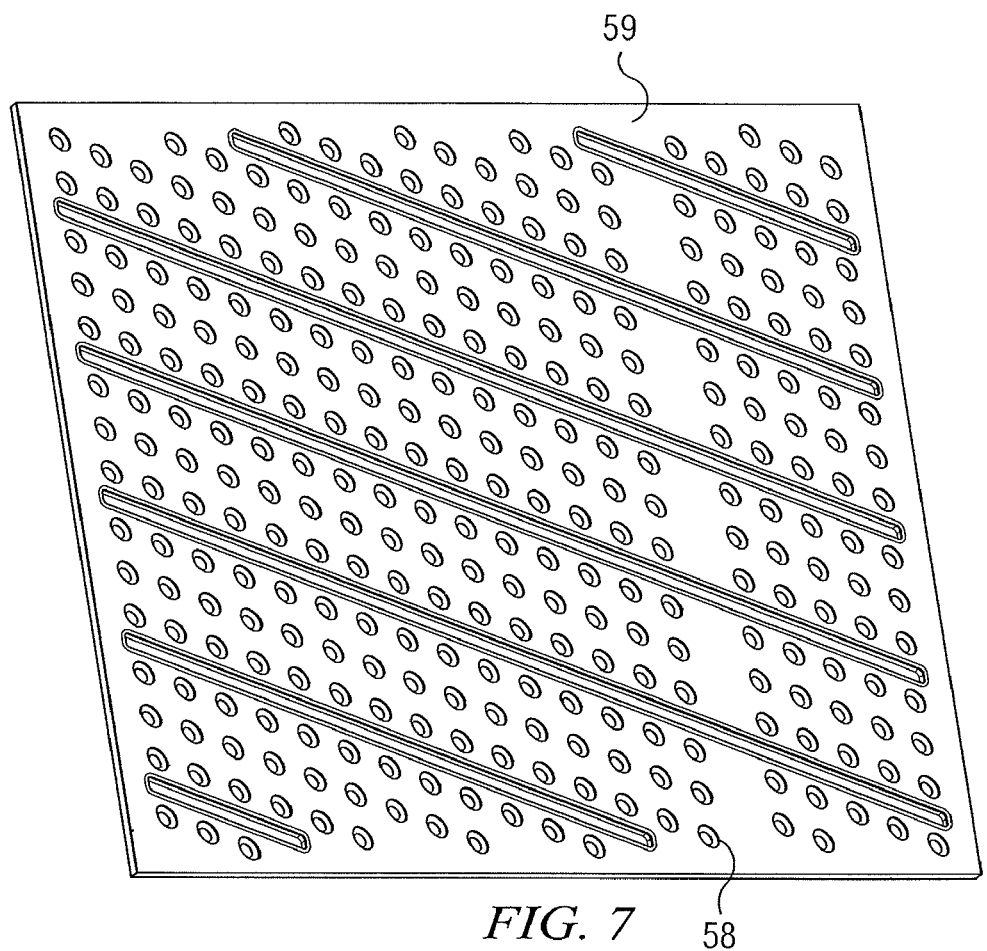
Figure 8:
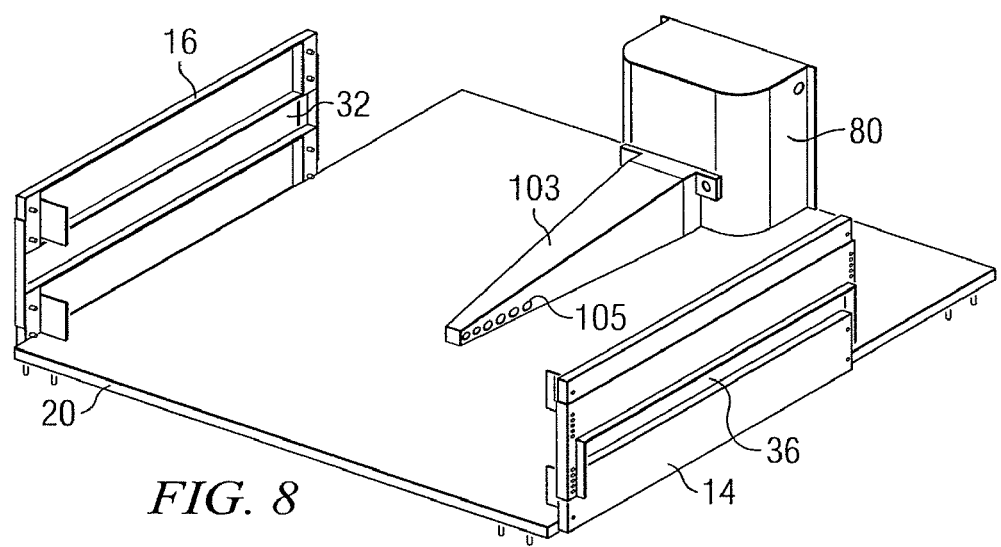
Figure 9:
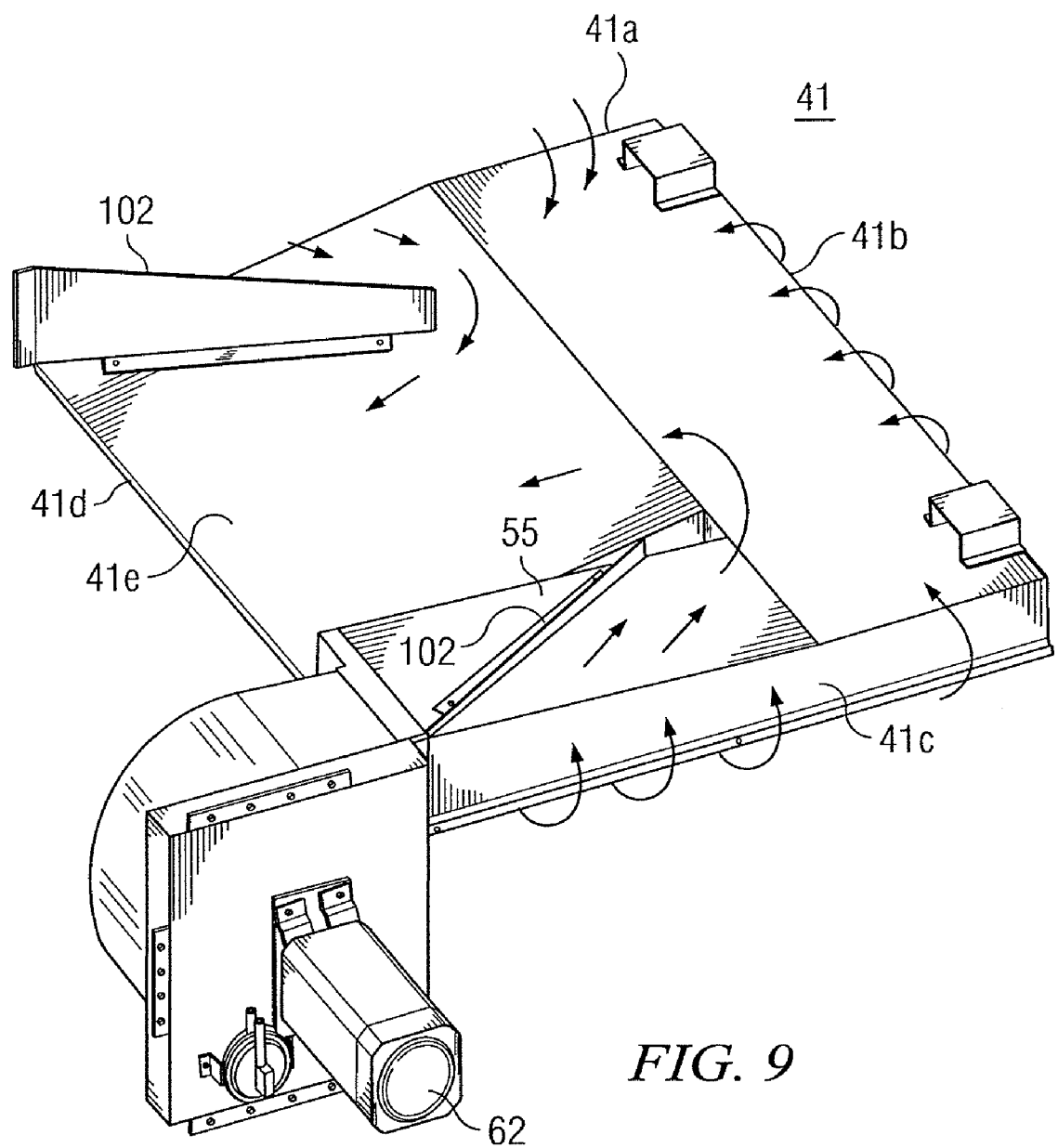
Figure 10:
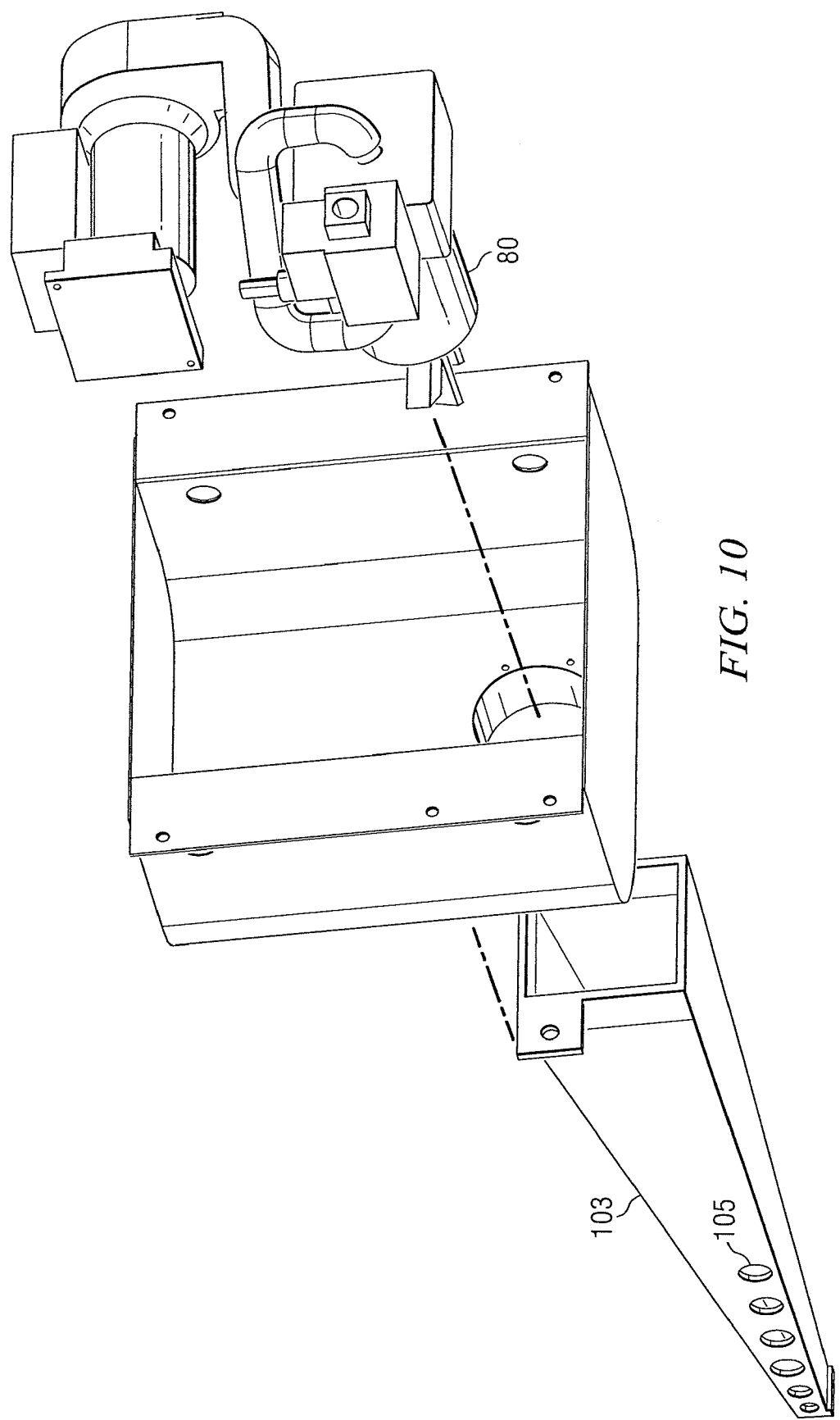
Figure 11:
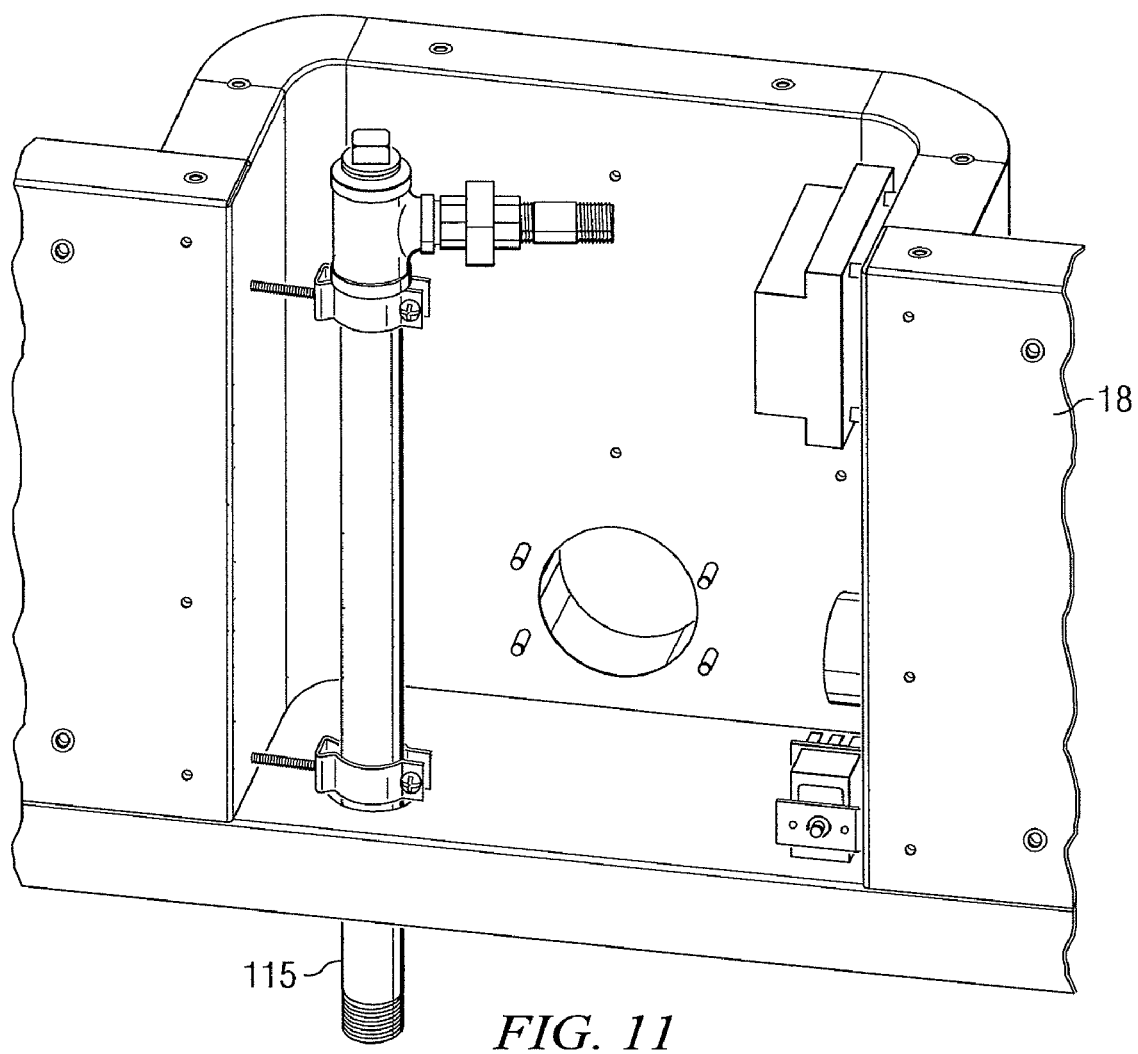
Figure 12:
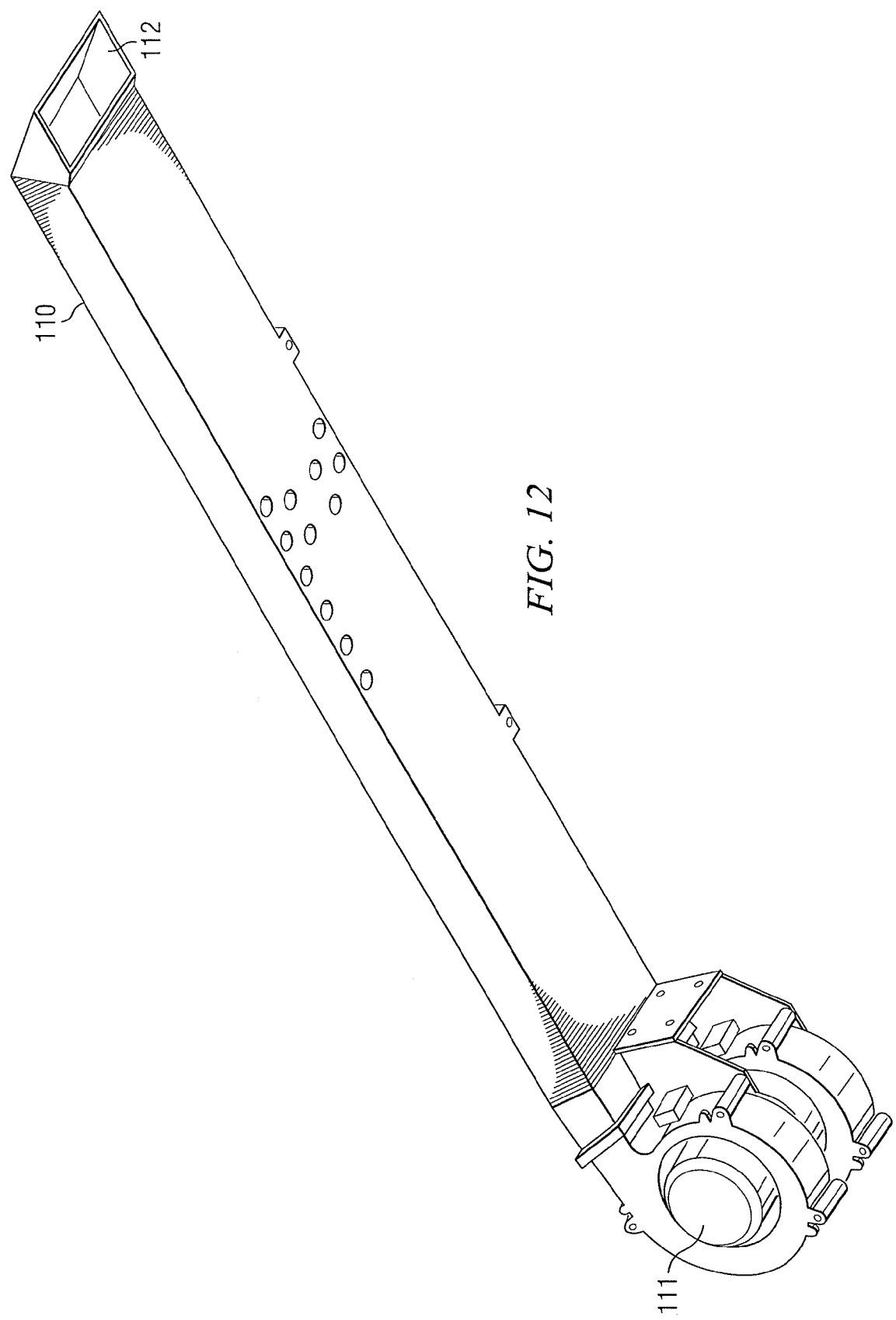

The novel features believed characteristic of the invention are set forth in the appended claims. The invention itself, however, as well as a preferred mode of use, further objectives and advantages thereof, will best be understood by reference to the following detailed description of an illustrative version when read in conjunction with the accompanying drawings, wherein:

FIG. 1 is a perspective view of a compact conveyor oven;
FIG. 2 is a front view of FIG. 1;
FIG. 3 is a right side view of FIG. 1;
FIG. 4 is an exploded view of FIG. 1;
FIG. 5 is a transparent top view of FIG. 1;
FIG. 6 is a view of a section of conveyor belt of FIG. 1;
FIG. 7 is a view of nozzle plate of FIG. 1;
FIG. 8 is a view of gas burner system of FIG. 1;
FIG. 9 is a perspective view detailing return air path;
FIG. 10 is exploded view of the gas burner of FIG. 8;
FIG. 11 is a view of internal gas piping of FIG. 1;
FIG. 12 illustrates the air cooling system of FIG. 1.

DESCRIPTION

With initial reference to FIGS. 1-3 compact conveyor oven 10 includes exterior front wall 12, exterior right side wall 14, exterior left side wall 16, exterior back wall 18, exterior bottom wall 20 and exterior top wall 22. Food products, not shown, are transported into and through cooking chamber 24 by conveyor 28. Preferably the conveyor assembly 28 comprises a continuous loop wire mesh conveyor belt which extends through entrance opening 32 and exit opening 36. The width of belt 28 is approximately 32 inches (81.28 cm.) and the length of belt 28 within cooking chamber 24 is approximately 40 inches (101.6 cm.). Preferably, the conveyor belt extends a sufficient distance from the entrance and exit openings of the oven to allow food products to be readily positioned on the conveyor belt for travel through the cooking chamber of the oven and removal upon exiting the oven.

Compact conveyor oven 10 may be supported by legs 25 and movable by rollers 27 or may sit on a shelf or table top, or be stacked one above another.

The compact conveyor oven is comprised of two independently controlled gas transfer systems, described herein as a top gas transfer system and a bottom gas transfer system and although the top and bottom gas transfer systems are identical, it is not required that they be identical. Described herein in detail is the top gas transfer system. The bottom system is made, functions and operates in the same manner as the top system. The term "gas" refers to any fluid mixture, including air, nitrogen and other mixtures that may be used for cooking, and applicant intends to encompass within the language and meaning any gas or gas mixture existing or developed in the future that performs the same function. Additionally, the term "airflow" refers to, and includes gas flow.

Top gas delivery system 40, FIG. 4 delivers temperature-controlled gas to the top side of conveyor belt 28 and lower gas delivery system 42 delivers gas to the bottom side of belt 28. Independent control of top and bottom gas transfer systems 40, 42 is known and further described in U.S. Pat. No. 5,717,192.

Top gas delivery system 40 is comprised of gas flow means 50, 60, 62, FIG. 5, and top gas transfer section 41, FIG. 9. Gas transfer section 41 is comprised of divider 200, nozzle plate 54, turning vanes 56, and gas transfer section side walls 41a-d and top wall 41e. Although section 41 is illustrated as tapered toward the back of oven 10, there is no requirement for such tapering. Nozzle plate 54 is further comprised of nozzle plate sections 55, 57, (divided By divider 200), described further herein, and nozzles 58. The size (area) of section 57 may be larger than that of section 55 (as shown in FIG. 5 and noted below); alternatively, sections 55 and 57 may be of equal size.

Variable speed blower motors and variable speed blower motor controllers may be utilized, but there is no requirement for their use and indeed the compact conveyor oven of the present invention may avoid the problems and complexity of variable speed blower motors by maintaining a constant gas flow, or alternatively, a substantially constant gas glow rate through the oven cooking chamber, gas transfer and gas delivery systems. Gas flows may be very aggressive, or less aggressive, depending upon the cooking requirements for each food product and one means to achieve gas flow modulation is by use of a gas pumping means such as a blower motor, blower wheel combination, utilizing a controller or a multi speed switch that allows for the switching of the blower motor speed in pre-determined fixed increments.

Connected to top blower wheel 50 is blower motor shaft 60, which is direct drive with electric motor 62, FIG. 5. Other means may be employed for coupling blower wheel 50 to electric motor 62, such as belt drive and the drive means is not limited to direct drive and applicant intends to encompass within the language any structure presently existing or developed in the future that performs the same function.

Gas is heated within combustion chamber 70, FIG. 5 by a gas combustion burner assembly 80 prior to delivery to blower wheel 50. Blower wheel 50 discharges gas into nozzle plate section 55 of gas transfer section 41 toward the front wall of oven 10. In order to achieve the compact design of our invention, the gas flow is then re-directed by vanes 56 and thereafter flows to larger nozzle section 57. Gas flow to larger section 57 pressurizes entire nozzle plate 54 allowing for substantially equal pressures throughout section 41. Substantially equal pressure throughout section 41 provides for substantially equal impingement of gas flow through nozzles 58 and onto the top of food product.

As can be seen in FIG. 2, after the gas is discharged through nozzle plate 54 and into cooking chamber 24 via apertures 58 the gas impinges upon any food product upon belt 28. Apertures 58 may be slotted, regularly formed or irregularly formed apertures and are illustrated herein as uniform nozzles, FIG. 7, and applicant intends to encompass within the meaning of nozzle any structure presently existing or developed in the future that performs the same function as nozzles 54 and as used herein the term "aperture" and "nozzle" have the same meaning. Apertures 58 are sized for a low pressure drop, while providing and maintaining sufficient gas velocities in the range of approximately 2000 ft/minute (609.6 meters/minute) to approximately 6000 ft/minute (1828.80 meters/minute) to properly cook the food product as described herein. In some instances, velocities below 2000 ft/minute (609.6 meters/minute) or above 6000 ft/minute (1828.80 meters/minute) may also be utilized, depending upon the particular food product to be cooked, or a particular cooking recipe that the controller is executing, and applicant does not intend to limit the invention to gas velocities within a particular range. Apertures 58 are sized such that substantially equivalent velocities of gas impinge against the top surface of belt 28.

Gas discharged through apertures 58 impinge upon food product, not shown, upon conveyor belt 28 and is then drawn toward entrance and exit openings 32, 36 where the spent gas is deflected upward by gas deflecting vanes 100 and then travels upward along transfer section side walls 41a, 41b and 41c, FIG. 9. The gas flows traveling up walls 41a and 41c is re-directed by deflecting vanes 102 for return to heating chamber 70, FIG. 5. Deflecting vanes 102 force gas to travel in a substantially uniform manner, thereby preventing short circuiting of the gas traveling up walls 41a, 41c toward the back of oven 10. As can be seen in FIG. 4, without deflecting vanes 102, gas toward the tapered end of section 41 (back wall 41d) would have shorter distance to travel and therefore would make more revolutions or cycles through the oven than gas returning further away from front wall 12 of oven 10.

Gas returning to heating chamber 70 may be reheated by gas combustion burner 80, FIGS. 5, 8, 10. In order to maintain the small size (footprint) of the compact conveyor oven, combustion gas burner 80 is placed between blower wheels 50, 52. Placement of combustion burner 80 between blower wheels 50, 52 sometimes requires burner 80 to be fitted with a burner tube, 103 FIG. 8. In order to assure flame efficiency, burner tube 103 is adjusted ("tuned") to allow a sufficient amount of make-up air to enter tube 103. Gas combustion occurs within tube 103 and then passes through apertures 105 for delivery to oven cavity 24.

Portions of compact oven 10 are cooled by cooling duct 110, FIG. 12 wherein fresh air is drawn through intake opening 112 by motor 111 and distributed throughout oven 10 as required. Placement of cooling duct 110 along the back of oven wall 18 provides spacing such that oven 10 cannot be positioned directly adjacent a wall or other structure or device because cooling duct 110 forms a self spacing air path in addition to a cooling mechanism for oven 10. In order to allow for additional footprint savings, gas plumbing pipe, 115, FIG. 11 is located within back wall 18 of oven 10. This allows one oven to be easily stacked upon another such oven.

As previously described, the top and bottom gas supply systems are the same configuration and function to uniformly circulate hot gas flow to the top and bottom sides of food product upon belt 28, and return the gas to the gas heating means for re-delivery to the cooking chamber.

The number and placement of the apertures 58 will vary according to the particular oven that is desired. For example, a general purpose compact conveyor oven may be scaled to a baking oven by changing the number of apertures, which may be fewer in number but be larger in size, thereby allowing for a more gentle gas flow across the food product, and producing proper delicate baking of the food product. If a browning oven were desired, the apertures may be more numerous and smaller in diameter. Additionally, the operator may desire more flexibility of cooking nozzle plates 54 may be fabricated in a manner that allows for quick change-out of the plates by the operator.

The gas flow within the conveyor oven, as well as other functions of cooking appliance 10 are directed by a controller, not shown. The controller determines, among other things, the velocity of gas flow, which may be constant or varied, or, may be constantly varied throughout the cooking cycle. It may be desired to cook the food product on one velocity throughout the entire cooking cycle, or to vary the gas velocity depending upon conditions such as a pre-determined cooking recipes, or vary the gas velocity in response to various sensors that may be placed within the cooking zone, oven return gas paths or various other positions within the oven. The location and placement of said sensors will be determined by the particular application of the oven. Additionally, other means may be utilized wherein data is transmitted back to the controller, and thereafter the controller adjusts the cooking recipe in an appropriate manner. For example sensors (temperature, humidity, velocity, vision and gas borne chemical mixture level sensors) may be utilized to constantly monitor the cooking conditions and adjust the gas flow, and other sensors not described herein may also be utilized and the compact cooking conveyor oven may utilize sensors that are not currently commercially practical due to cost or other limitations (such as laser, non-invasive temperature sensors, IR sensors and laser to locate the sensed area and other sensors that are currently too expensive to be commercially feasible), and the oven is not limited to those discussed herein, as many sensing devices are known and utilized in and applicant intends to encompass within the language any structure presently existing or developed in the future that performs the same function.

Although the top gas flow system has been described in detail, the bottom gas system functions in the same manner although lower nozzle plate 59 contains channels or grooves that allow conveyor belt runners 61, FIG. 6 of conveyor belt 28 to ride or glide within channels 59, thereby enabling belt 28 to be located closer to lower nozzles 58. Location of belt 28 closer to nozzles 58 allows for higher heat transfer rates to the bottom sides of food products upon belt 28. Conveyor belt 28 is fitted with floating bearings 66, FIG. 6 that allow for simplified maintenance and tensioning of belt 28.

Although the exemplary embodiment illustrates the use of a two blower design with one blower providing the gas flow to the top of the cooking cavity and a second blower for gas flow to the bottom of the cooking cavity, one gs flow means may be utilized, or more than two gas flow means may be utilized and applicant intends to encompass within the language any structure presently existing or developed in the future that performs the same function.

Although one version present invention has been described in considerable detail with reference to certain preferred versions thereof, other versions are possible. For example, various sizes of compact conveyor ovens may be made. In these cases larger or smaller component parts may be utilized, and fewer or more components may be employed. In the case where it is desirable to make a smaller conveyor oven, one gas flow acceleration means may be utilized instead of two; smaller or fewer thermal gas devices may be used.

To summarize, the present invention provides for a compact conveyor oven utilizing hot gas flow, supplied from combustion energy in order to achieve faster cooking of food products. The compact conveyor oven is simple and economical to manufacture, use and maintain, and is directly scalable to larger or smaller embodiments.

Other modifications and improvements thereon will become readily apparent. Accordingly, the spirit and scope of the present invention is to be considered broadly and limited only by the appended claims, and not by the foregoing specification. Any element in a claim that does not explicitly state "means for" performing a specific function, or "step for" performing a specific function, is not to be interpreted as a "means" or "step" clause as specified in 35 U.S.C. §112, ¶6. In particular, the use of "step of" in the claims herein is not intended to invoke the provisions of 35 U.S.C. §112.

The invention claimed is:

1. A compact conveyor oven for cooking a food product, comprising:
    a cooking chamber;
    a gas delivery system;
    a flow means for causing circulation of the gas;
    a first gas transfer section disposed above the food product and operably associated with the flow means;
    the first gas transfer section further comprising a divider;
    wherein the divider separates the first gas transfer section into a first nozzle plate section and a second nozzle plate section; wherein each nozzle plate section is comprised of a plurality of nozzles;
    turning vanes within the first gas transfer section; wherein a gas flow is discharged from the flow means into the first nozzle plate section and at least a portion of the gas flow is re-directed by the turning vanes to flow into the second nozzle plate section; and
    wherein substantially equal pressurization of the gas passing through the nozzles of the first gas transfer section is achieved.

2. The oven of claim 1 further comprising:
    a second gas transfer section disposed below the food product and operably associated with the flow means; and
    turning vanes within the second gas transfer section.

3. The oven of claim 2 wherein the first gas transfer section operates independently of the second gas transfer section.

4. The oven of claim 3 further comprising:
    a control means for controlling the gas flow.

5. The oven of claim 1 wherein the flow means is a blower motor.

6. The oven of claim 5 wherein the blower motor runs at variable speeds.

7. The oven of claim 1 further comprising a means for heating the gas.

8. The oven according to claim 7 wherein the means for heating the gas is gaseous fuel.

9. The oven according to claim 2 wherein at least one flow means provides gas to the first and to the second gas transfer sections.

10. The oven according to claim 7 wherein the means for heating the gas is direct or indirect.

11. A compact conveyor oven for cooking a food product, comprising:
    a cooking chamber;
    a gas delivery system;
    a flow means for causing circulation of the gas;
    a conveyor means to convey food through the cooking chamber, the cooking chamber having an entrance opening and an exit opening;
    directing vanes disposed at the entrance opening and exit opening;
    a first gas transfer section with a bottom side and a top side and disposed above the food product and operably associated with the flow means;
    the first gas transfer section comprising a plurality of nozzles, wherein the top side of the first gas transfer section comprises a divider that separates the first gas transfer section into a first nozzle plate section and a second nozzle plate section, and further comprising one or more turning vanes positioned on the top side of the first gas transfer section, wherein a as flow is discharged from the flow means into the first nozzle plate section and at least a portion of the gas flow is re-directed by the turning vanes to flow into the second nozzle plate section, such that substantially equal pressurization of the gas passing through the nozzles to the bottom side of the first gas transfer section is achieved,
    wherein spent airflow from the bottom side of the first gas transfer section is directed towards the entrance opening and the exit opening; and
    wherein the directing vanes direct spent airflow to the top side of the first gas transfer section.

12. The oven according to claim 11 further comprising a means for heating the gas.

13. The oven according to claim 12 wherein the spent airflow from the top side of the first gas transfer section is directed to the means for heating the gas.

14. The oven according to claim 12 wherein the means for heating the gas is direct or indirect.

15. The oven according to claim 12 further comprising a second gas transfer section with a bottom side and a top side and disposed below the food product and operably associated with the flow means; wherein spent airflow from the top side of the second gas transfer section is directed towards the entrance opening and the exit opening; and wherein the directing vanes direct spent airflow to the means for heating the gas via the bottom side of the second gas transfer section.

16. The oven according to claim 15 further comprising:

deflecting vanes disposed on the top side of the first gas transfer section and the bottom side of the second gas transfer section; wherein the deflecting vanes are position to prevent short circuiting of airflow returning to the means for heating the gas.

17. A compact conveyor oven for cooking a food product, comprising:

an exterior back wall;
a cooking chamber spaced from the exterior back wall;
a gas delivery system;
a flow means for causing circulation of the gas;
a first gas transfer section comprising a plurality of nozzles, a divider that separates the first gas transfer section into a first nozzle plate section and a second nozzle plate section, and one or more turning vanes; wherein a gas flow is discharged from the flow means into the first nozzle plate section and at least a portion of the gas flow is re-directed by the turning vanes to flow into the second nozzle plate section, such that substantially equal pressurization of the gas passing through the nozzles is achieved, a cooling duct comprising an intake opening and a motor;
wherein the cooling duct is disposed along the exterior back wall so that the exterior back wall is between the cooking chamber and at least part of the cooling duct, providing for spacing such that the oven cannot be positioned directly adjacent a wall or other structure; and wherein cooling air is drawn through the intake opening by the motor and thereafter distributed throughout the oven.

18. The oven according to claim 17 further comprising a means for heating the gas.

19. The oven of claim 1, wherein at least a portion of the first gas transfer section is tapered toward a back of the oven.

20. The oven of claim 11, wherein at least a portion of the first gas transfer section is tapered toward a back of the oven.

21. The oven of claim 17, wherein at least a portion of the first gas transfer section is tapered toward a back of the oven.

22. The oven of claim 1, wherein the divider prevents gas flow from the first nozzle plate section to the second nozzle plate section except at the turning vanes.

23. The oven of claim 11, wherein the divider prevents gas flow from the first nozzle plate section to the second nozzle plate section except at the turning vanes.

24. The oven of claim 17, wherein the divider prevents gas flow from the first nozzle plate section to the second nozzle plate section except at the turning vanes.

25. The oven of claim 1, wherein the first nozzle plate section is smaller than the second nozzle plate section.

26. The oven of claim 11, wherein the first nozzle plate section is smaller than the second nozzle plate section.

27. The oven of claim 17, wherein the first nozzle plate section is smaller than the second nozzle plate section.

* * * * *